(12) United States Patent
Han et al.

(10) Patent No.: US 10,061,148 B2
(45) Date of Patent: Aug. 28, 2018

(54) BACKLIGHT MODULE, LIQUID CRYSTAL PANELS AND LIQUID CRYSTAL DEVICES

(71) Applicant: Wuhan China Star Optoelectronics Technology Co., Ltd., Wuhan, Hubei (CN)

(72) Inventors: Yun Han, Guangdong (CN); Lulu Xie, Guangdong (CN)

(73) Assignee: Wuhan China Star Optoelectronics Technology Co., Ltd, Wuhan, Hubei (CN)

( * ) Notice: Subject to any disclaimer, the term of this patent is extended or adjusted under 35 U.S.C. 154(b) by 33 days.

(21) Appl. No.: 15/229,504

(22) Filed: Aug. 5, 2016

(65) Prior Publication Data

US 2017/0351138 A1 Dec. 7, 2017

(30) Foreign Application Priority Data

Jun. 7, 2016 (CN) .......................... 2016 1 0395146

(51) Int. Cl.
*G02F 1/1333* (2006.01)
*G02F 1/1335* (2006.01)
*G02F 1/1368* (2006.01)

(52) U.S. Cl.
CPC ...... *G02F 1/133382* (2013.01); *G02F 1/1368* (2013.01); *G02F 1/133308* (2013.01); *G02F 1/133504* (2013.01); *G02F 1/133514* (2013.01); *G02F 1/133553* (2013.01); *G02F 1/133603* (2013.01); *G02F 1/133617* (2013.01); *G02F 1/133528* (2013.01); *G02F 1/133606* (2013.01); *G02F 2001/133314* (2013.01); *G02F 2001/133614* (2013.01); *G02F 2202/36* (2013.01); *G02F 2203/11* (2013.01)

(58) Field of Classification Search
CPC ......... G02F 1/133382; G02F 1/133504; G02F 1/133514; G02F 1/133617; G02F 1/133308; G02F 1/1368; G02F 2001/133314; G02F 1/133528; G02F 2202/36; G02F 2001/133614; G02F 1/133553
See application file for complete search history.

(56) References Cited

U.S. PATENT DOCUMENTS

| 2009/0315816 | A1* | 12/2009 | Choi ................... G02F 1/13338 345/82 |
| 2012/0313912 | A1* | 12/2012 | Kanbayashi ........ G02F 1/13318 345/207 |
| 2014/0176836 | A1* | 6/2014 | Brecht .............. B32B 17/10036 349/16 |

* cited by examiner

*Primary Examiner* — Michael Caley
*Assistant Examiner* — Mariam Qureshi
(74) *Attorney, Agent, or Firm* — Andrew C. Cheng

(57) ABSTRACT

A backlight module includes a back plate, a diffuser opposite to the back plate, a plurality of dot light sources arranged on a surface of the backplate facing toward the diffuser in a matrix, thermal emitters configured between the dot light sources, and an optical film configured on the surface of the diffuser facing away the backplate. In addition, the present disclosure also relates to a liquid crystal panel and a liquid crystal device (LCD). The backlight module radiates infrared rays toward the liquid crystal panel, and the liquid crystal within the liquid crystal panel may convert the infrared rays into heat. That is, the absorbed rays may be converted into thermal energy heating up the liquid crystal panel. Thus, even at a low temperature, the LCD may function normally.

2 Claims, 2 Drawing Sheets

BACKLIGHT MODULE, LIQUID CRYSTAL PANELS AND LIQUID CRYSTAL DEVICES

BACKGROUND OF THE INVENTION

1. Field of the Invention

The present disclosure relates to liquid crystal display technology, and more particularly to a backlight module, a liquid crystal panel, and a liquid crystal device (LCD).

2. Discussion of the Related Art

With the development of Optoelectronics and semiconductor technologies, flat panel displays are greatly developed. Among the flat panel display, LCD is characterized by attributes such as high space efficiency, low power consumption, no radiation, and low electromagnetic interference, and has been adopted in various devices.

LCD usually includes a liquid crystal panel and a backlight module opposite to the liquid crystal panel, wherein the backlight module provides an uniform display light source to the liquid crystal panel such that the liquid crystal panel may display the images. The liquid crystal panel usually includes a color filter (CF) substrate, a thin film transistor (TFT) array substrate, and a liquid crystal layer therebetween. The liquid crystal layer includes liquid crystal, which is the material sensitive to the temperature. When the temperature is low, the liquid crystal becomes very sticky, and may transition from the liquid crystal state to crystals, which may result in that the liquid crystal panel is unable to display normally.

SUMMARY

To overcome the above-mentioned problems, a self-heating backlight module, a liquid crystal panel, and a LCD are provided.

In one aspect, a backlight module includes: a back plate; a diffuser opposite to the back plate; a plurality of dot light sources arranged on a surface of the backplate facing toward the diffuser in a matrix; thermal emitters configured between the dot light sources; and an optical film configured on the surface of the diffuser facing away the backplate.

Wherein at least one thermal emitter configured between two adjacent dot light sources.

Wherein the thermal emitter is an infrared-ray light emitting diode (LED), and the dot light source is a visible-ray LED.

In another aspect, a liquid crystal device (LCD), comprising a liquid crystal panel and a backlight module opposite to the liquid crystal panel, the backlight module includes: a back plate opposite to the liquid crystal panel; a diffuser between the back plate and the liquid crystal panel; a plurality of dot light sources arranged on a surface of the backplate facing toward the diffuser in a matrix; thermal emitters configured between the dot light sources; and an optical film is configured on the surface of the diffuser facing away the backplate.

Wherein a first uni-direction infrared reflection film is arranged on the surface of the liquid crystal panel facing toward the backlight module, a first surface of the first uni-direction infrared reflection film faces toward the backlight module, and a second surface of the first uni-direction infrared reflection film adheres to the liquid crystal panel, wherein when the infrared rays radiate along a direction from the first surface to the second surface, the infrared rays pass through the first surface and the second surface in sequence, and when the infrared rays radiate along the direction from the second surface to the first surface, the infrared rays are reflected by the first surface or the second surface.

Wherein a second uni-direction infrared reflection film is arranged on the surface of the liquid crystal panel facing away the backlight module, a third surface of the second uni-direction infrared reflection film faces away the backlight module, and a fourth surface of the second uni-direction infrared reflection film adheres to the liquid crystal panel, wherein when the infrared rays radiate along the direction from the third surface to the fourth surface, the infrared rays pass through the third surface and the fourth surface in sequence, and when the infrared rays radiate along the direction from the fourth surface to the third surface, the infrared rays are reflected by the third surface or the third surface.

Wherein at least one thermal emitter configured between two adjacent dot light sources.

Wherein the thermal emitter is an infrared-ray light emitting diode (LED), and the dot light source is a visible-ray LED.

In another aspect, a liquid crystal panel includes: a color-filter (CF) substrate, a thin-film transistor (TFT) array substrate, and a liquid crystal layer between the CF substrate and the TFT array substrate, and the liquid crystal panel includes: a first uni-direction infrared reflection film arranged on the surface of the CF substrate facing away the CF substrate, a first surface of the first uni-direction infrared reflection film faces away the TFT array substrate, and a second surface of the first uni-direction infrared reflection film adheres to the TFT array substrate, wherein when the infrared rays radiate along a direction from the first surface to the second surface, the infrared rays pass through the first surface and the second surface in sequence, and when the infrared rays radiate along the direction from the second surface to the first surface, the infrared rays are reflected by the first surface or the second surface.

Wherein a second uni-direction infrared reflection film adheres to the surface of the CF substrate facing away the TFT array substrate, a third surface of the second uni-direction infrared reflection film faces away the CF substrate, and a fourth surface of the second uni-direction infrared reflection film adheres to the CF substrate, wherein when the infrared rays radiate along the direction from the third surface to the fourth surface, the infrared rays pass through the third surface and the fourth surface in sequence, and when the infrared rays radiate along the direction from the fourth surface to the third surface, the infrared rays are reflected by the third surface or the third surface.

The backlight module radiates infrared rays toward the liquid crystal panel, and the liquid crystal within the liquid crystal panel may convert the infrared rays into heat, that is, the absorbed rays may be converted into thermal energy, which may heat up the liquid crystal panel. Thus, even at a low temperature, the LCD may function normally.

DETAILED DESCRIPTION OF THE EMBODIMENTS

Figure 1:
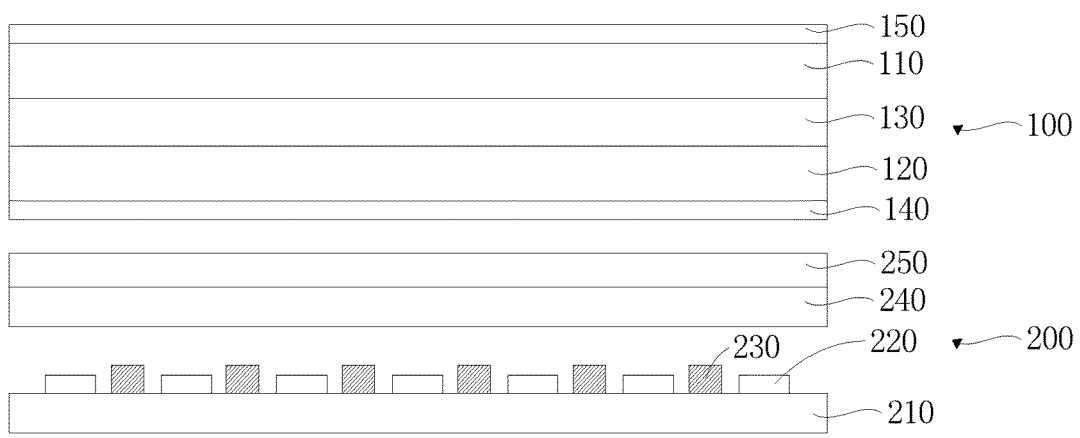
FIG. 1 is a schematic view of the LCD in accordance with one embodiment.

Various example embodiments will now be described more fully with reference to the accompanying drawings in which some example embodiments are shown. In the drawings, the thicknesses of layers and regions may be exaggerated for clarity. In the following description, in order to avoid the known structure and/or function unnecessary detailed description of the concept of the invention result in confusion, well-known structures may be omitted and/or functions described in unnecessary detail.

It should be noted that the relational terms herein, such as "first", "second", "third", and "fourth", are used only for differentiating one entity or operation, from another entity or operation, which, however do not necessarily require or imply that there should be any real relationship or sequence. Therefore, without departing from the teachings of the present disclosure, the first element discussed below may be termed a second element.

FIG. 1 is a schematic view of the LCD in accordance with one embodiment. Referring to FIG. 1, the LCD includes a liquid crystal panel 100 and a backlight module 200. The backlight module 200 provides an uniform surface light source for the liquid crystal panel 100 such that the liquid crystal panel 100 may display images via the uniform surface light source.

Figure 2:
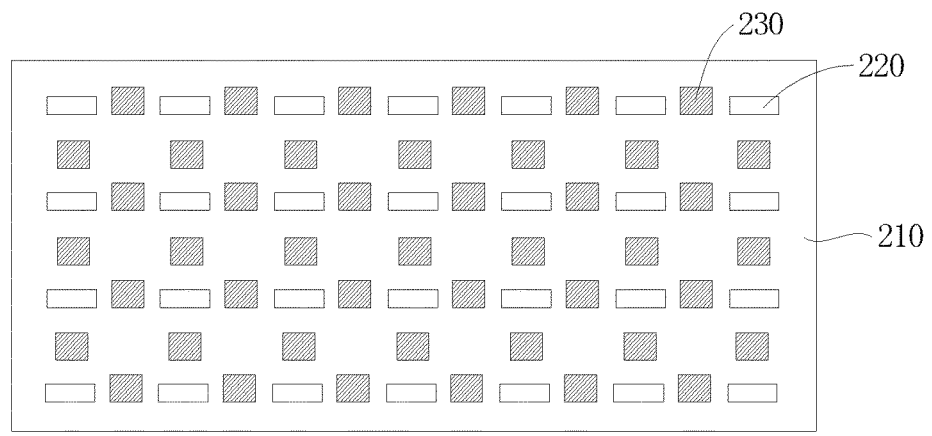
FIG. 2 is a schematic view of the configuration of the dot light sources and the thermal emitter in accordance with one embodiment.

FIG. 2 is a schematic view of the configuration of the dot light sources and the thermal emitter in accordance with one embodiment. The backlight module 200 includes a backplate 210, a plurality of dot light sources 220, a plurality of thermal emitters 230, a diffuser 240, and an optical film 250. It is to be noted that FIG. 1 only show a portion of the optical components of the backlight module 200, that is, the backlight module 200 may include other components, such as assemblies for fixing the diffuser 240 and the optical film 250, and other optical components may be needed.

Specifically, the backplate 210 is opposite to the diffuser 240. The dot light sources 220 are arranged on a surface of the backplate 210 facing toward the diffuser 240 in a matrix. A gap is configured between two adjacent dot light sources 220. In one embodiment, referring to FIG. 2, a thermal emitter 230 is configured between two adjacent dot light sources 220, but the present disclosure is not limited thereto. The thermal emitter 230 is configured to radiate infrared rays with a specific wavelength. The optical film 250 is configured on the surface of the diffuser 240 facing away the backplate 210.

The diffuser 240 is configured to uniformly diffuse the visible rays from the dot light sources 220 and the infrared rays from the thermal emitter 230. The optical film 250 is configured for enhancing the optical performance of the diffused visible rays and the infrared rays.

In the embodiment, the dot light source 220 is a visible-ray light emitting diode (LED). The thermal emitter 230 is an infrared-ray LED, but the present disclosure is not limited thereto.

The absorbing rate of the liquid crystal toward the infrared rays may be greater subject to the infrared rays with the specific wavelength. In an example, the backlight module 200 radiates infrared rays toward the liquid crystal panel 100, and the liquid crystal within the liquid crystal panel 100 may convert the infrared rays into heat, that is, the absorbed rays may be converted into thermal energy, which may heat up the liquid crystal panel 100. Thus, even at a low temperature, the LCD may function normally.

Referring to FIG. 1, the liquid crystal panel 100 includes the CF substrate 110, the TFT array substrate 120, and the liquid crystal layer 130 therebetween, wherein the liquid crystal layer 130 includes liquid crystals.

Further, a first uni-direction infrared reflection film 140 is arranged on the surface of the CF substrate 110 facing away the TFT array substrate 120, and a second uni-direction infrared reflection film 150 is arranged on the surface of the CF substrate 110 facing away the TFT array substrate 120. In addition, a first polarizer (not shown) is configured on the surface of the first uni-direction infrared reflection film 140 facing away the TFT array substrate 120, and a second polarizer (not shown) may be configured on the surface of the second uni-direction infrared reflection film 150 facing away the CF substrate 110.

It is to be noted that, in other embodiments, only the first uni-direction infrared reflection film 140 or the second uni-direction infrared reflection film 150 is configured. The principles of the uni-direction infrared reflection film will be described hereinafter.

Figure 3:
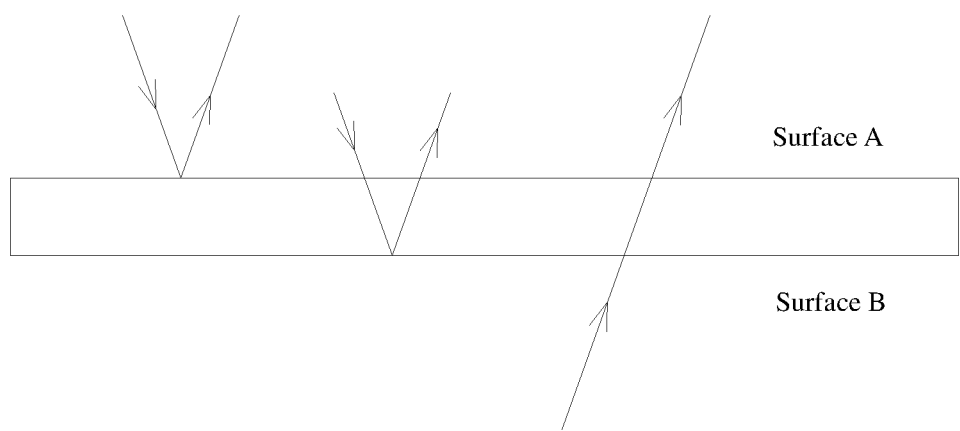
FIG. 3 is a schematic view showing the uni-direction infrared reflection film in accordance with one embodiment.

FIG. 3 is a schematic view showing the uni-direction infrared reflection film in accordance with one embodiment.

Referring to FIG. 3, the arrows indicate the transmission paths of the infrared rays. In FIG. 3, the top surface of the uni-direction infrared reflection film is defined as "surface A", and the down surface of the uni-direction infrared reflection film is defined as "surface B". When the infrared rays radiate on the surface B and toward the surface A, the infrared rays pass through the surface B and the surface A in sequence. When the infrared rays radiate on the surface A into the surface B, the infrared rays are reflected by the surface A or the surface B.

In the embodiment, referring to FIG. 1, the surface A of the first uni-direction infrared reflection film 140 adheres to the surface of the TFT array substrate 120 facing away the CF substrate 110. In this way, the surface B of the first uni-direction infrared reflection film 140 faces toward the backlight module 200 or faces away the TFT array substrate 120. The surface A of the second uni-direction infrared reflection film 150 adheres to the surface of the CF substrate 110 facing away the TFT array substrate 120. In this way, the surface B of the second uni-direction infrared reflection film 150 faces away the backlight module 200 or the CF substrate 110.

Thus, the infrared rays within the liquid crystal panel 100 may be repeatedly reflected between the first uni-direction infrared reflection film 140 and the second uni-direction infrared reflection film 150, and thus a great of amount of the infrared rays may be absorbed by the liquid crystals.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A liquid crystal device (LCD), comprising a liquid crystal panel and a backlight module opposite to the liquid crystal panel, the backlight module comprising:
   a back plate opposite to the liquid crystal panel;
   a diffuser between the back plate and the liquid crystal panel;
   a plurality of dot light sources arranged on a surface of the back plate facing toward the diffuser in a matrix;

thermal emitters configured between the dot light sources and arranged on the surface of the back plate, wherein each of the thermal emitters is respectively configured between two adjacent dot light sources; and an optical film is configured on the surface of the diffuser facing away the back plate;

wherein a first uni-direction infrared reflection film is arranged on the surface of a thin-film transistor (TFT) array substrate of the liquid crystal panel facing toward the backlight module, a first surface of the first uni-direction infrared reflection film faces toward the backlight module, and a second surface of the first uni-direction infrared reflection film adheres to the TFT array substrate, wherein when the infrared rays radiate along a direction from the first surface to the second surface, the infrared rays pass through the first surface and the second surface in sequence, and when the infrared rays radiate along the direction from the second surface to the first surface, the infrared rays are reflected by the first surface or the second surface;

wherein a second uni-direction infrared reflection film is arranged on the surface of a color-filter (CF) substrate of the liquid crystal panel facing away the backlight module, a third surface of the second uni-direction infrared reflection film faces away the backlight module, and a fourth surface of the second uni-direction infrared reflection film adheres to the CF substrate, wherein when the infrared rays radiate along the direction from the third surface to the fourth surface, the infrared rays pass through the third surface and the fourth surface in sequence, and when the infrared rays radiate along the direction from the fourth surface to the third surface, the infrared rays are reflected by the third surface or the fourth surface; and wherein the first uni-direction infrared reflection film is disposed between a first polarizer and the TFT array substrate and the second uni-direction infrared reflection film is disposed between a second polarizer and the CF substrate.

2. The LCD as claimed in claim 1, wherein the thermal emitter is an infrared-ray light emitting diode (LED), and the dot light source is a visible-ray LED.

* * * * *